United States Patent
Rahul (10) Patent No.: US 12,259,999 B2
(45) Date of Patent: Mar. 25, 2025

(54) INFORMATION MANAGEMENT DEVICE, INFORMATION MANAGEMENT SYSTEM AND INFORMATION MANAGEMENT METHOD

(71) Applicant: HONDA MOTOR CO., LTD., Tokyo (JP)

(72) Inventor: Rahul, Swindon (GB)

(73) Assignee: HONDA MOTOR CO., LTD., Tokyo (JP)

( * ) Notice: Subject to any disclaimer, the term of this patent is extended or adjusted under 35 U.S.C. 154(b) by 385 days.

(21) Appl. No.: 17/686,480

(22) Filed: Mar. 4, 2022

(65) Prior Publication Data

US 2022/0284121 A1 Sep. 8, 2022

(30) Foreign Application Priority Data

Mar. 8, 2021 (EP) .................................... 21161326

(51) Int. Cl.
*G06F 21/62* (2013.01)
*G06F 21/60* (2013.01)
*H04L 9/40* (2022.01)

(52) U.S. Cl.
CPC .......... *G06F 21/6245* (2013.01); *G06F 21/60* (2013.01); *G06F 21/62* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 10,963,582 B1 * | 3/2021 | McCown | G06F 21/602 |
| 11,675,929 B2 * | 6/2023 | Brannon | G06Q 10/0637 726/30 |
| 11,727,141 B2 * | 8/2023 | Brannon | G06F 11/3006 717/101 |
| 11,843,603 B2 * | 12/2023 | Sato | H04L 63/0876 |
| 11,952,225 B2 * | 4/2024 | Harting | B65G 1/14 |
| 2014/0143837 A1 * | 5/2014 | Fletcher | H04L 63/105 726/4 |
| 2014/0309813 A1 | 10/2014 | Ricci | |
| 2021/0075782 A1 * | 3/2021 | Dunjic | G06F 9/4451 |
| 2022/0269813 A1 * | 8/2022 | Patel | H04W 12/009 |

FOREIGN PATENT DOCUMENTS

JP 2000-293421 10/2000

* cited by examiner

Primary Examiner — Lashonda Jacobs-Burton
(74) Attorney, Agent, or Firm — Rankin, Hill & Clark LLP (57) ABSTRACT

An information management device or the like capable of quickly and appropriately inquiring of a user propriety of using at least a part of personal information data is provided. A DA unit 2 as the information management device includes a controller 2a and a wireless communication circuit 2c. The controller 2a acquires, when an activation request to any one of a plurality of application software is generated, the personal information data used by the one piece of application software and acquires a propriety status of consent to use the personal information data for each item, and when the item without the consent to use is included, determines a terminal with a highest probability of being used by the user based on the current time and a correlation model, and transmits an inquiry signal which inquires the propriety of the consent to use the non-consent item to the terminal.

3 Claims, 8 Drawing Sheets

INFORMATION MANAGEMENT DEVICE, INFORMATION MANAGEMENT SYSTEM AND INFORMATION MANAGEMENT METHOD

BACKGROUND OF THE INVENTION

Field of the Invention

The present invention relates to an information management device, an information management system and an information management method which manage personal information data and a customer consent status.

Description of the Related Art

Conventionally, as an information management device which manages personal information data, the device described in Japanese Patent Laid-Open No. 2000-293421 is known. The information management device comprises a database, and the database includes a lot of personal information data. In the case of the information management device, the personal information data in the database is offered to external business application software and third party application software. The business application software is defined as four kinds of application software such as routine application software, and in the four kinds of application software, ranges and kinds of the offered personal information data are predetermined in four stages.

In the case where the application software is installed in the information management device itself and it is not permitted by a user to use at least a part of the personal information data used by the application software, propriety of the use needs to be inquired to the user. In contrast, in the case of the conventional information management device described above, since there is no such a standpoint, there is a problem that the propriety of using at least a part of the personal information data cannot be quickly and appropriately inquired to the user.

The present invention is implemented to solve the problem described above, and it is an object to provide an information management device or the like capable of quickly and appropriately inquiring of a user the propriety of using at least a part of personal information data.

SUMMARY OF THE INVENTION

In order to achieve the object, the invention relating to claim 1 is an information management device which manages personal information data of a user, and comprises:
  a first storage unit configured to store the personal information data for each item and store a propriety status of consent to use the personal information data for each item;
  a second storage unit configured to store a plurality of pieces of application software that can be activated and the personal information data used by the plurality of pieces of application software;
  a third storage unit configured to store a correlation model indicating a correlation between a plurality of network communicable terminals owned by the user and a probability that the user uses the plurality of terminals for each time slot;
  an acquisition unit configured to acquire, when an activation request to any one of the plurality of pieces of application software is inputted, use information data which is the personal information data used by the one piece of application software from the second storage unit, and acquire the propriety status of the consent to use the use information data for each item from the first storage unit;
  a determination unit configured to determine a first terminal which is the terminal with the highest probability of being used by the user based on the current time and the correlation model stored in the third storage unit, in the case where a non-consent item which is the item without the consent to use is included in an acquisition result by the acquisition unit; and
  a communication unit configured to transmit an inquiry signal which inquires propriety of the consent to use the non-consent item to the first terminal determined by the determination unit, wherein
  the determination unit determines a second terminal which is the terminal with the second highest probability of being used by the user after the first terminal among the plurality of terminals as a transmission destination of the inquiry signal based on the current time and the correlation model, when a reply signal including a reply of the user to inquiry of the inquiry signal is not received in the communication unit within a predetermined period of time after the inquiry signal is transmitted to the first terminal, and
  the communication unit transmits the inquiry signal to the second terminal.

According to the information management device, when an activation request is inputted to any one of the plurality of pieces of application software, by the acquisition unit, the use information data which is the personal information data used by the one piece of application software is acquired from the second storage unit, and the propriety status of the consent to use the use information data is acquired for each item from the first storage unit. Then, in the case that a non-consent item which is the item without the consent to the use is included in the acquisition result by the acquisition unit, by the determination unit, the first terminal which is the terminal with the highest probability of being used by the user is determined based on the current time and the correlation model stored in the third storage unit. Further, by the communication unit, the inquiry signal which inquires the propriety of the consent to use the non-consent item is transmitted to the first terminal determined by the determination unit. In this way, the inquiry signal which inquires the propriety of the consent to use the non-consent item is transmitted to the first terminal which is the terminal with the highest probability of being used by the user so that the propriety of the consent to use the non-consent item in the personal information data can be quickly and appropriately inquired to the user.

According to the information management device, when a reply signal including a reply of the user to the inquiry of the inquiry signal is not received in the communication unit within a predetermined period of time after the inquiry signal is transmitted to the first terminal, by the determination unit, the second terminal which is the terminal with the second highest probability of being used by the user after the first terminal among the plurality of terminals is determined as a transmission destination of the inquiry signal based on the current time and the correlation model, and the inquiry signal is transmitted to the second terminal by the communication unit. In this way, since the inquiry signal is transmitted to the second terminal with the second highest probability of being used by the user after the first terminal in the case where it is estimated that the first terminal is in an OFF state or the user is not using the first terminal, a possibility that the inquiry signal is received by the terminal being used by the user can be increased.

An information management system relating to claim 2 comprises the information management device according to claim 1 and the plurality of terminals.

In order to achieve the object described above, the invention relating to claim 3 is an information management method which manages personal information data of a user with confidentiality by an information management device, and the information management device
stores the personal information data for each item,
stores a propriety status of consent to use the personal information data for each item,
stores a plurality of pieces of application software that can be activated and the personal information data used by the plurality of pieces of application software,
stores a correlation model indicating a correlation between a plurality of network communicable terminals owned by the user and a probability that the user uses the plurality of terminals for each time slot,
acquires, when an activation request to any one of the plurality of pieces of application software is inputted, use information data which is the personal information data used by the one piece of application software,
acquires the propriety status of the consent to use the use information data for each item,
determines a first terminal which is the terminal with the highest probability of being used by the user based on the current time and the correlation model, in the case where a non-consent item which is the item without the consent to use is included in the use information data,
transmits an inquiry signal which inquires propriety of the consent to use the non-consent item to the first terminal,
activates the one piece of application software when a signal of consenting to use the non-consent item is received from the first terminal after the inquiry signal is transmitted to the first terminal,
determines a second terminal which is the terminal with the second highest probability of being used by the user after the first terminal among the plurality of terminals as a transmission destination of the inquiry signal based on the current time and the correlation model, when a reply signal including a reply of the user to inquiry of the inquiry signal is not received in the communication unit within a predetermined period of time after the inquiry signal is transmitted to the first terminal, and
transmits the inquiry signal to the second terminal.

DETAILED DESCRIPTION OF THE PREFERRED EMBODIMENT

Hereinafter, an information management system relating to one embodiment of the present invention will be described with reference to the drawings. The information management system of the present embodiment manages personal information data of a plurality of users.

Figure 1:
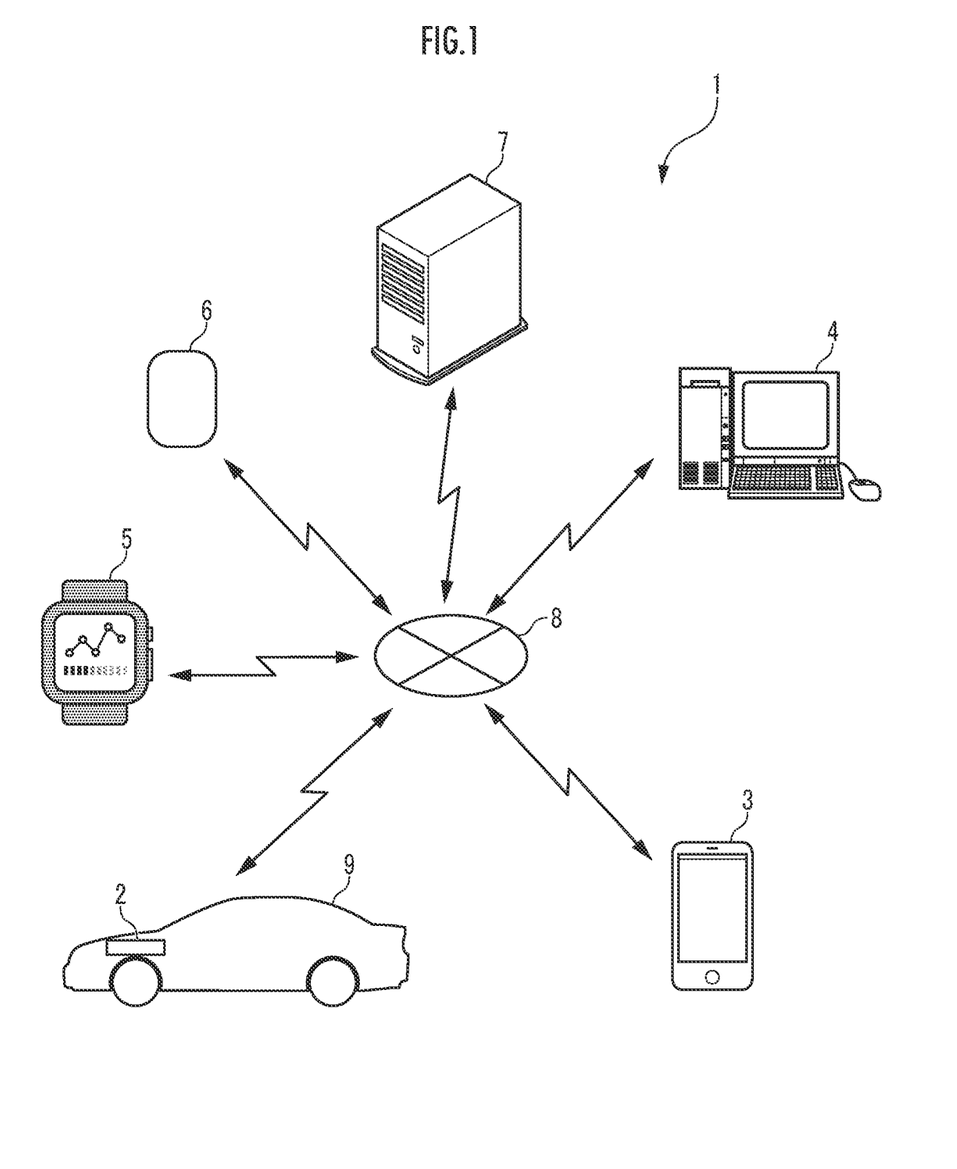
FIG. 1 is a diagram illustrating a configuration of an information management system comprising an information management device relating to one embodiment of the present invention.

As illustrated in FIG. 1, an information management system 1 of the present embodiment is configured by many DA (Display Audio) units 2, many portable terminals 3, many personal computers 4, many smart watches 5, many smart speakers 6, and many data servers 7 or the like (only one each is illustrated). In the information management system 1, the elements 2-7 are data communicably connected via a network 8, and the network 8 is configured by a wireless network and a cable network or the like.

Figure 2:
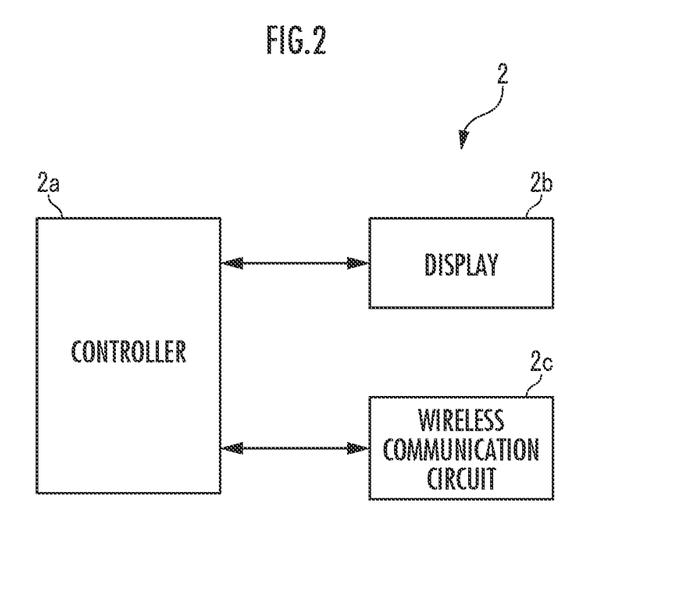
FIG. 2 is a block diagram illustrating an electrical configuration of a DA unit.

The DA unit 2 as an information management device is loaded on a vehicle 9, and comprises a controller 2a, a display 2b and a wireless communication circuit 2c or the like as illustrated in FIG. 2. The controller 2a is configured by a microcomputer comprising a processor, a storage, a memory and an I/O interface or the like.

In the storage of the controller 2a, a database including many pieces of personal information data of a user of the DA unit 2, that is a user of the vehicle 9 (referred to as a "specific user" hereinafter), is stored. In addition, various kinds of application software are installed in the storage of the controller 2a, and in the application software, a set of the personal information data of the specific user (referred to as a "personal information data set" hereinafter) used at the activation is linked.

The personal information data set is configured in a tabular form, and includes various kinds of data items and data of a privacy status and a consent status for each of the data items. For example, in an example of the personal information data set illustrated in FIG. 3, four of "Name", "Location", "Trip" and "Heart rate" are included as the data items.

Figure 3:
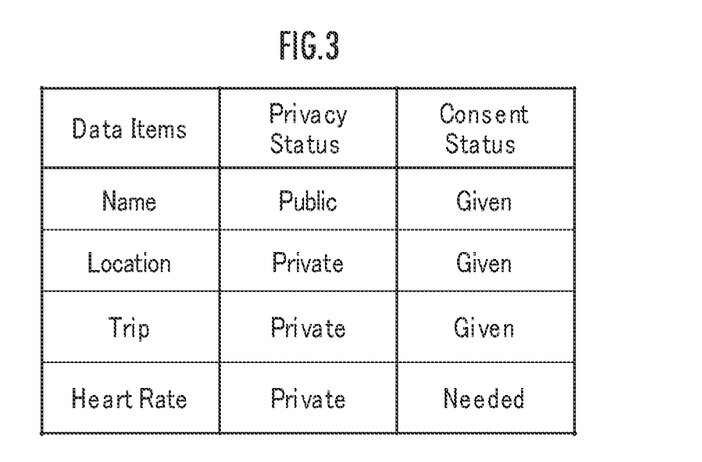
FIG. 3 is a diagram illustrating an example of personal information data in a database.

In addition, two kinds of "Public" and "Private" are set as the privacy status in the four data items, and two kinds of "Given" and "Needed" are set as the consent status in the four data items.

In the database inside the storage of the controller 2a, many pieces of the personal information data configured as above are included. The databases are prepared in the data server 7 by communication between the data server 7 and the elements 2-7 described above, stored in the data server 7, and transmitted from the data server 7 to the DA unit 2. Thus, the database of the personal information data of the specific user is stored in the storage of the controller 2a.

Further, in the storage of the controller 2a, a terminal probability map (not illustrated) is stored. The terminal probability map indicates a relation between various kinds of terminals connectable to the information management system 1 and owned by the specific user and a probability that the specific user is using the various kinds of terminals for each time slot. The terminal probability map is prepared by sampling a use status of the various kinds of terminals in the specific user and statistically analyzing the sampling result.

The "terminal" in this case can display inquiry information in an inquiry signal to be described later and output voice, and specifically, the portable terminal 3, the personal computer 4, the smart watch 5, and the smart speaker 6 or the like described above correspond to the terminal. In the present embodiment, the terminal probability map corresponds to a correlation model, and the controller 2a corresponds to a first storage unit, a second storage unit, a third storage unit, an acquisition unit and a determination unit.

Further, the display 2b is configured by a capacitance type touch panel, and is arranged such that the front surface faces inside of a compartment. On the display 2b, various kinds of icons corresponding to the various kinds of application software installed in the controller 2a, and various kinds of image information and music information or the like are displayed. In addition, on the display 2b, when an input operation (operations of tapping, swiping, pinch-out and pinch-in or the like, for example) by the user is executed, an operation signal indicating the operation is outputted to the controller 2a.

In addition, the controller 2a executes data communication with the data server 7 or the like via the network 8 by controlling a communication status of the wireless communication circuit 2c. In the present embodiment, the wireless communication circuit 2c corresponds to a communication unit.

Further, the portable terminal 3 is a smartphone type, and comprises a non-illustrated controller, a display and a non-illustrated wireless communication circuit or the like. In the controller, various kinds of application software are installed. The portable terminal 3 is configured to execute communication with the DA unit 2 and the data server 7, and inquiry answer processing is executed when the inquiry signal is received from the DA unit 2 as described later.

The personal computer 4 comprises a processor, a storage and an I/O interface (none is illustrated), and various kinds of application software are installed in the storage. The personal computer 4 is configured to execute the communication with the DA unit 2 and the data server 7, and executes the inquiry answer processing to be described later when the inquiry signal to be described later is received from the DA unit 2.

In addition, the smart watch 5 comprises a processor, a storage and an I/O interface (none is illustrated), and various kinds of application software are installed in the storage. The smart watch 5 is configured to execute the communication with the DA unit 2 and the data server 7, and the inquiry answer processing to be described later is executed when the inquiry signal to be described later is received from the DA unit 2.

Further, in the smart speaker 6, various kinds of application software are installed. The smart speaker 6 is configured to execute the communication with the DA unit 2 and the data server 7, and when the inquiry signal to be described later is received from the DA unit 2, information included in the inquiry signal is outputted by voice.

Further, the data server 7 comprises a processor, a storage, an I/O interface and a wireless communication circuit or the like (none is illustrated). In the storage, a database of the personal information data described above is stored. The database is prepared as described below.

First, data communication is executed among the DA unit 2, the portable terminal 3, the personal computer 4, the smart watch 5, the smart speaker 6 and the data server 7 described above, and by executing filtering processing based on social laws and regulations and management standards on the information management system to the communication result, the database is prepared. In addition, in the case where addition and change of content of the database are generated based on a result of the data communication, the database is updated.

Next, with reference to FIGS. 4-8, the content of a communication control operation executed in the information management system 1 configured as above will be described. The case where the specific user owns the portable terminal 3, the personal computer 4, the smart watch 5 and the smart speaker 6 will be described as an example below.

Figure 4:
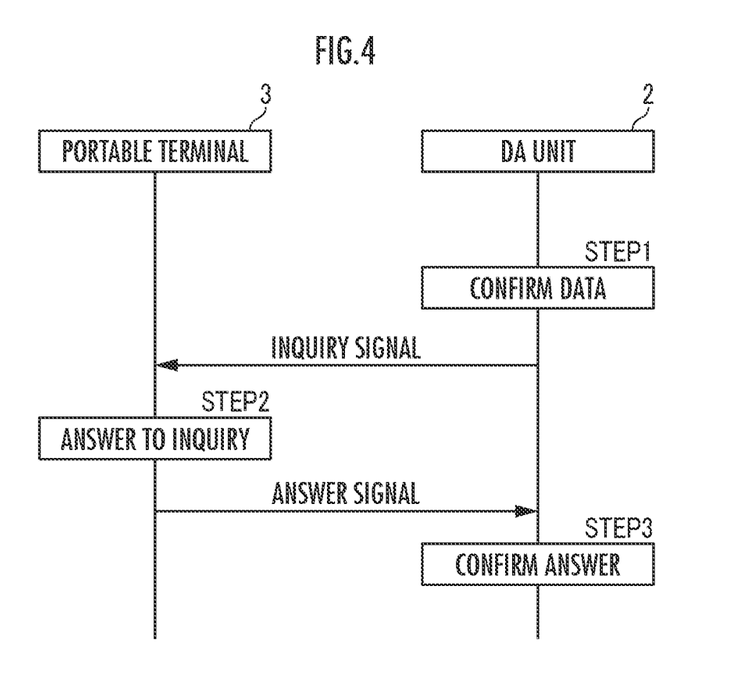
FIG. 4 is a sequence diagram for describing a communication control operation example of the information management system.

First, in the DA unit 2, data confirmation processing is executed (FIG. 4/STEP1). The processing is specifically executed as illustrated in FIG. 5.

Figure 5:
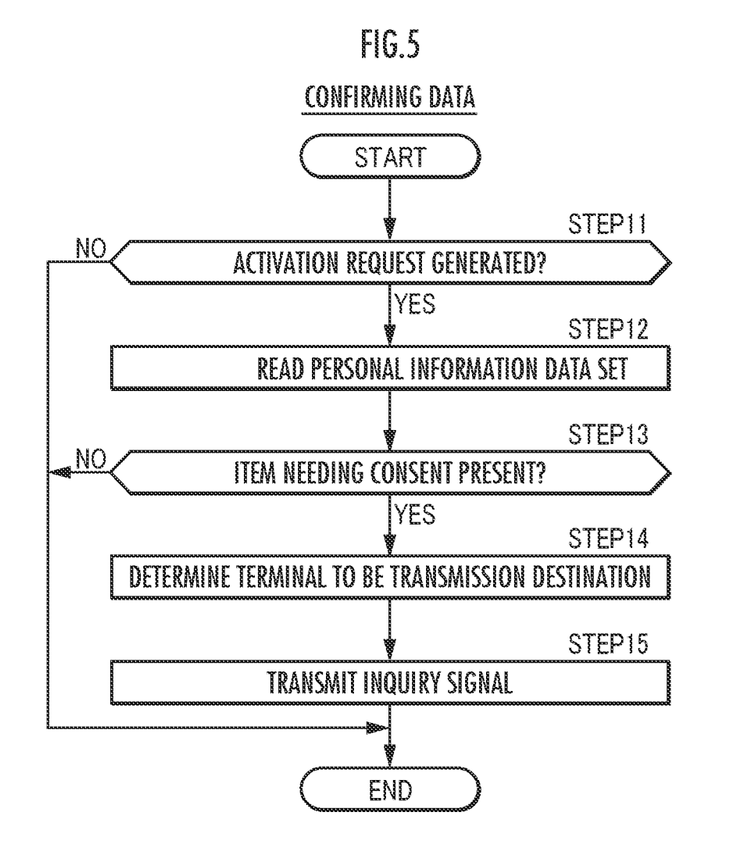
FIG. 5 is a flowchart illustrating data confirmation processing.

First, whether or not an activation request for any one of the plurality of pieces of application software is generated is determined (FIG. 5/STEP11). Note that, in the following description, the one piece of application software is referred to as "specific software". In this case, specifically, it is determined that the activation request for the specific software is generated when either one of (f1)-(f2) below is established, and it is determined that the activation request for the specific software is not generated otherwise.

(f1) An icon of the specific software displayed on the display 2b of the DA unit 2 is tapped/pressed by an operator. The operator in this case may be the specific user or may be a user other than the specific user.

(f2) The DA unit 2 receives an activation request signal for the specific software installed in the DA unit 2 from any one of the portable terminal 3, the personal computer 4, the smart watch 5 and the smart speaker 6.

When the determination is negative (FIG. 5/STEP11 . . . NO) and the activation request for the specific software is not generated, the present processing is ended as it is. On the other hand, when the determination is affirmative (FIG. 5/STEP11 . . . YES) and the activation request for the specific software is generated, the personal information data set of the specific user linked with the specific software is read (FIG. 5/STEP12).

Next, whether or not an item needing consent is present in the personal information data set is determined (FIG. 5/STEP13). When the determination is negative (FIG. 5/STEP13 . . . NO), the present processing is ended as it is. On the other hand, when the determination is affirmative (FIG. 5/STEP13 . . . YES) and the item needing the consent (for example, "Heart rate" in the personal information data set illustrated in FIG. 3 described above) is present in the personal information data set, the terminal to be a transmission destination of the inquiry signal is determined (FIG. 5/STEP14).

Specifically, by referring to the terminal probability map described above, the terminal with the highest probability of being used by the specific user at the current time is determined as the terminal to be the transmission destination of the inquiry signal. The inquiry signal is for inquiring propriety of the consent for the item needing the consent of the specific user. The case where the terminal with the highest probability of being used by the specific user is the portable terminal 3 of the specific user will be described as an example below. In this case, the portable terminal 3 corresponds to a first terminal.

Next, the inquiry signal is transmitted to the portable terminal 3 of the specific user (FIG. 5/STEP15). Thereafter, the present processing is ended.

Returning to FIG. 4, when a power source of the portable terminal 3 is ON when the inquiry signal from the DA unit 2 is received in the portable terminal 3 of the specific user accompanying execution of the data confirmation processing in the DA unit 2, the inquiry answer processing is executed (FIG. 4/STEP2). The inquiry answer processing is specifically executed as illustrated in FIG. 6.

Figure 6:
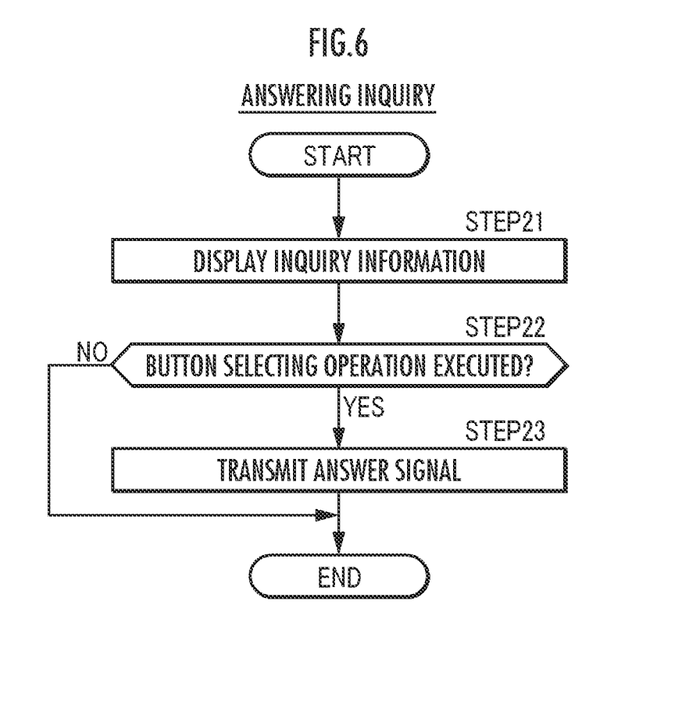
FIG. 6 is a flowchart illustrating inquiry answer processing.
Figure 7:
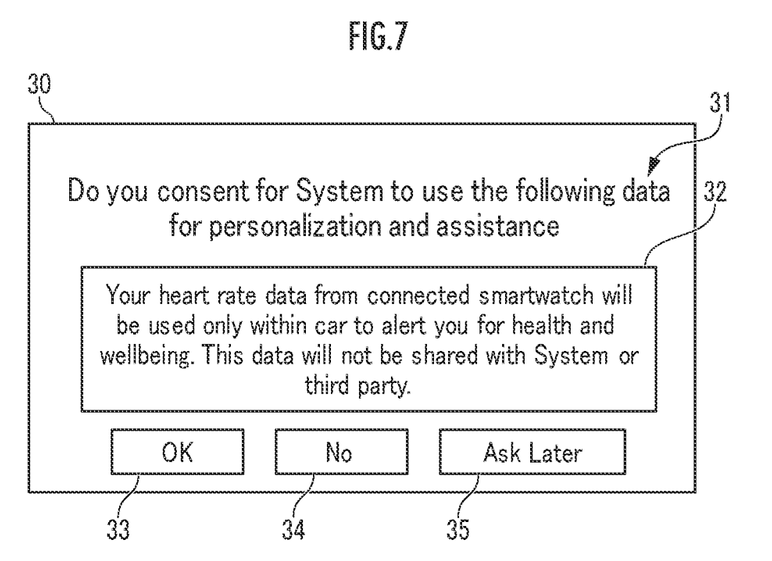
FIG. 7 is a diagram illustrating an inquiry information screen.

First, display processing of the inquiry information is executed (FIG. 6/STEP21). In the display processing, an inquiry information screen 30 as illustrated in FIG. 7 is displayed on the display of the portable terminal 3. In the case of the inquiry information screen 30, a sentence 31 asking whether or not to consent to use data is displayed on an upper side, and inside a display frame 32 on the lower side, explanatory text regarding use of the item "Heart rate" in the personal information data set is displayed.

Further, on the lower side of the display frame 32, an "OK" button 33, a "No" button 34 and an "Ask Later" button 35 are displayed from left to right, and the specific user selects and taps/presses the buttons 33-35 when replying to the question described above. In the following description, selecting and tapping/pressing any one of the buttons 33-35 by the specific user is referred to as a "button selecting operation".

Then, whether or not the specific user has executed the button selecting operation is determined (FIG. 6/STEP22). When the determination is negative (FIG. 6/STEP22 . . . NO), the present processing is ended as it is. On the other hand, when the determination is affirmative (FIG. 6/STEP22 . . . YES) and the specific user has selected and operated any one of the buttons 33-35, an answer signal indicating the selected button is transmitted to the DA unit 2 (FIG. 6/STEP23). Thereafter, the present processing is ended. In the present embodiment, the answer signal corresponds to a reply signal.

Returning to FIG. 4, in the DA unit 2, following the data confirmation processing described above, answer confirmation processing is executed (FIG. 4/STEP3). The answer confirmation processing is specifically executed as illustrated in FIG. 8.

First, whether or not the answer signal described above is received is determined (FIG. 8/STEP31). When the determination is affirmative (FIG. 8/STEP31 . . . YES) and the answer signal is received, whether or not an OK button is operated is determined based on the answer signal (FIG. 8/STEP32). When the determination is negative (FIG. 8/STEP32 . . . NO), the present processing is ended as it is.

Figure 8:
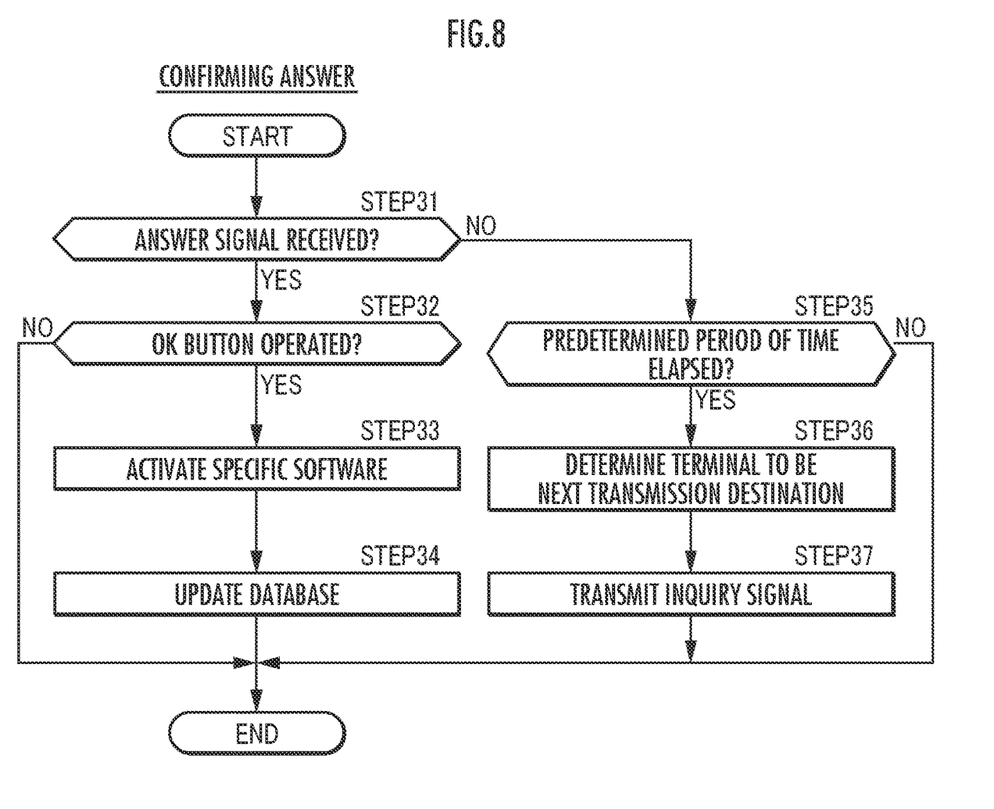
FIG. 8 is a flowchart illustrating answer confirmation processing.

On the other hand, when the determination is affirmative (FIG. 8/STEP32 . . . YES) and the OK button is operated, the specific software is activated (FIG. 8/STEP33). Then, update processing of the database is executed (FIG. 8/STEP34). Specifically, in the personal information data set of the specific user linked to the specific software, the consent status of the item "Heart rate" is updated to "Given". Thereafter, the present processing is ended.

On the other hand, when the determination described above is negative (FIG. 8/STEP31 . . . NO) and the answer signal is not received, whether or not a predetermined period of time has elapsed after the inquiry signal described above is transmitted to the portable terminal 3 is determined (FIG. 8/STEP35).

When the determination is negative (FIG. 8/STEP35 . . . NO), the present processing is ended as it is. On the other hand, when the determination is affirmative (FIG. 8/STEP35 . . . YES) and the predetermined period of time has elapsed after the inquiry signal is transmitted to the portable terminal 3, the terminal to be the next transmission destination is determined (FIG. 8/STEP36).

Specifically, by referring to the terminal probability map described above, the terminal with the second highest probability of being used by the specific user after the portable terminal 3 at the current time is determined as the terminal to be the next transmission destination. The case where the terminal with the second highest probability of being used by the specific user after the portable terminal 3, is the personal computer 4 of the specific user will be described as an example below. In this case, the personal computer 4 corresponds to a second terminal.

Then, to the personal computer 4 of the specific user, the inquiry signal described above is transmitted (FIG. 8/STEP37). Thereafter, the present processing is ended.

Next, with reference to FIG. 9, an example of the communication control operation after the inquiry signal is transmitted from the DA unit 2 to the personal computer 4 after the predetermined period of time has elapsed after the inquiry signal is transmitted to the portable terminal 3 as described above will be described.

Figure 9:
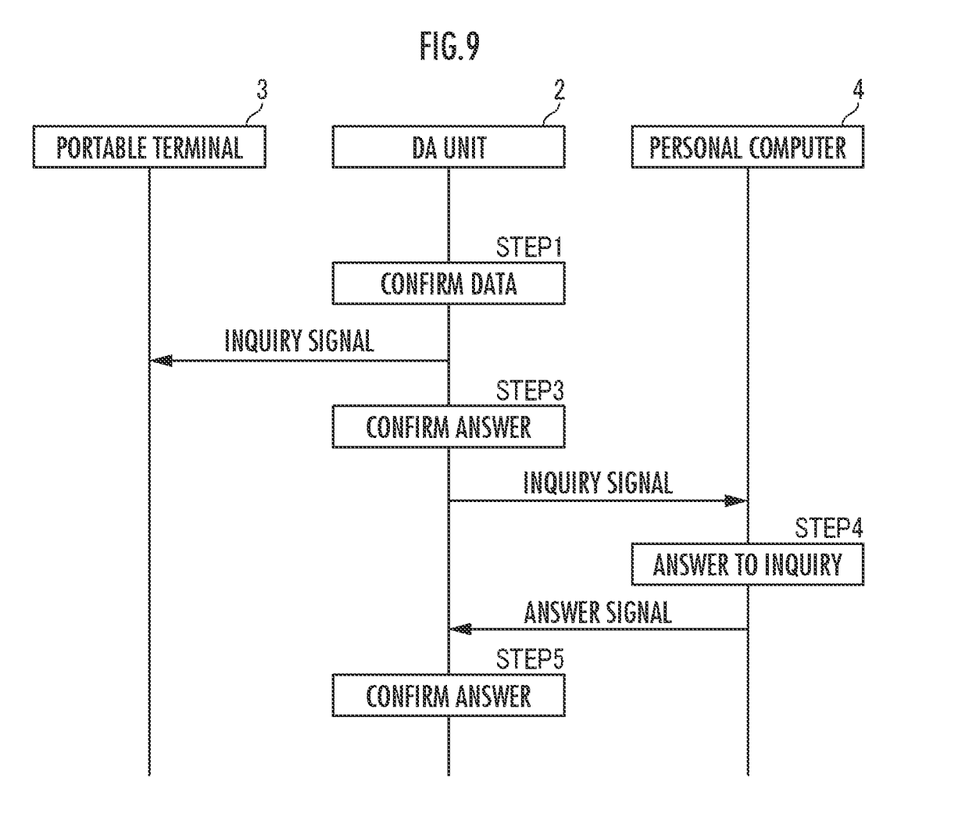
FIG. 9 is a sequence diagram for describing a communication control operation example of the information management system.

As illustrated in FIG. 9, when the personal computer 4 is in an ON state when the inquiry signal from the DA unit 2 is received in the personal computer 4, the inquiry answer processing is executed (FIG. 9/STEP4). The inquiry answer processing is specifically executed similarly to the inquiry answer processing in FIG. 6. That is, when the button is selected by the specific user, the answer signal indicating the selected button is transmitted from the personal computer 4 to the DA unit 2.

In addition, in the DA unit 2, the answer confirmation processing is executed (FIG. 9/STEP5) following the answer confirmation processing in STEP3 described above (see FIG. 8). The answer confirmation processing is specifically executed similarly to the answer confirmation processing in FIG. 8. That is, when the answer signal from the personal computer 4 is received in the DA unit 2, operation determination of the OK button or the like is executed.

On the other hand, in the case where a status of not receiving the answer signal in the DA unit 2 continues for the predetermined period of time or longer after the inquiry signal described above is transmitted to the personal computer 4, by referring to the terminal probability map described above, the terminal to be the next transmission destination of the inquiry signal is determined. For example, in the case where the next transmission destination of the inquiry signal is determined to be the smart speaker 6, though not illustrated, the inquiry signal is transmitted from the DA unit 2 to the smart speaker 6.

Then, when the smart speaker 6 receives the inquiry signal from the DA unit 2, the information (the information illustrated in FIG. 7) included in the inquiry signal is outputted from the smart speaker 6 as voice information and character information.

Next, in the case where a reply by the voice of the specific user is inputted to the smart speaker 6 after the inquiry signal is transmitted from the DA unit 2 to the smart speaker 6, the answer signal indicating the reply is transmitted from the smart speaker 6 to the DA unit 2.

On the other hand, in the case where the status of not receiving the answer signal in the DA unit 2 continues for the predetermined period of time or longer after the inquiry signal is transmitted from the DA unit 2 to the smart speaker 6, in the DA unit 2, by referring to the terminal probability map described above, the terminal to be the next transmission destination of the inquiry signal is determined. In this case, the smart watch 5 is determined to be the next transmission destination of the inquiry signal.

As above, according to the DA unit 2 as the information management device of the present embodiment, when the activation request for the specific software is generated, the personal information data set of the specific user linked to the specific software is read. Then, when the item needing the consent is present in the personal information data set, by referring to the terminal probability map, the first terminal which is the terminal with the highest probability of being used by the specific user at the current time is determined, and the inquiry signal is transmitted to the first terminal. Thus, the propriety of using the item needing the consent in the personal information data can be quickly and appropriately inquired to the specific user at the terminal with the highest probability of being used by the specific user at the current time.

In addition, when the answer signal is not received from the first terminal even after the predetermined period of time has elapsed after the inquiry signal is transmitted to the first terminal with the highest probability of being used by the specific user, the inquiry signal is transmitted to the second terminal with the second highest probability of being used by the specific user at the current time. Thus, since the inquiry signal is transmitted to the second terminal with the second highest probability of being used by the user after the first terminal in the case where it is estimated that, at the current time, the specific user is not using the first terminal or the power source of the first terminal is in an OFF state, a possibility that the inquiry signal is received by the terminal being used by the user can be increased.

While the embodiment is an example in which the portable terminal 3, the personal computer 4, the smart watch 5 and many smart speakers 6 are used as the terminal, the terminal of the present invention is not limited thereto and may be the one capable of network communication. For example, a tablet PC may be used as the terminal.

In addition, while the embodiment is an example in which the DA unit 2 is used as the information management device, the information management device of the present invention is not limited thereto and may be the one comprising the first storage unit, the second storage unit, the third storage unit, the acquisition unit and the determination unit. For example, the data server 7 may be used as the information management device.

Further, while the embodiment is an example in which the information management system 1 is configured to comprise many DA units 2, many portable terminals 3, many personal computers 4, many smart watches 5, many smart speakers 6 and many data servers 7 or the like, the information management system 1 may be configured to comprise the other device (a client server, for example).

REFERENCE SIGNS LIST

1 Information management system
2 DA unit (information management device)
2*a* Controller (first storage unit, second storage unit, third storage unit, acquisition unit, determination unit)
2*c* Wireless communication circuit (communication unit)
3 Portable terminal (terminal, first terminal)
4 Personal computer (terminal, second terminal)
5 Smart watch (terminal)
6 Smart speaker (terminal)

The invention claimed is:

1. An information management device which manages personal information data of a user, the information management device comprising:
a controller; and
a wireless communication circuit,
wherein the controller comprises a processor and a memory, wherein the controller is configured to function as:
a first storage unit configured to store the personal information data for each item and store a propriety status of consent to use the personal information data for each item;
a second storage unit configured to store a plurality of pieces of application software that can be activated and the personal information data used by the plurality of pieces of application software;
a third storage unit configured to store a correlation model indicating a correlation between a plurality of network communicable terminals owned by the user and a probability that the user uses a plurality of terminals for each time slot;
an acquisition unit configured to acquire, when an activation request to any one piece of application software of the plurality of pieces of application software is inputted, use information data which is the personal information data used by the one piece of application software from the second storage unit, and acquire the propriety status of consent to use the use information data for each item from the first storage unit; and
a determination unit configured to determine a first terminal which is a terminal of the plurality of terminals with a highest probability of being used by the user based on a current time and the correlation model stored in the third storage unit, in a case where a non-consent item which is an item without consent to use is included in an acquisition result by the acquisition unit,
the wireless communication circuit is configured to transmit an inquiry signal which inquires propriety status of consent to use the non-consent item to the first terminal determined by the determination unit,
the determination unit is configured to determine a second terminal which is a terminal with a second highest probability of being used by the user after the first terminal among the plurality of terminals as a transmission destination of the inquiry signal based on the current time and the correlation model, when a reply signal including a reply of the user to inquiry of the inquiry signal is not received in the wireless communication circuit within a predetermined period of time after the inquiry signal is transmitted to the first terminal, and
the wireless communication circuit is configured to transmit the inquiry signal to the second terminal.

2. An information management system comprising:
a plurality of terminals; and
an information management device,
wherein the information management device manages personal information data of a user, and the information management device comprises:
a controller; and
a wireless communication circuit,
the controller comprises a processor and a memory, wherein the controller is configured to function as:

a first storage unit configured to store the personal information data for each item and store a propriety status of consent to use the personal information data for each item;

a second storage unit configured to store a plurality of pieces of application software that can be activated and the personal information data used by the plurality of pieces of application software;

a third storage unit configured to store a correlation model indicating a correlation between a plurality of network communicable terminals owned by the user and a probability that the user uses the plurality of terminals for each time slot;

an acquisition unit configured to acquire, when an activation request to any one piece of application software of the plurality of pieces of application software is inputted, use information data which is the personal information data used by the one piece of application software from the second storage unit, and acquire the propriety status of consent to use the use information data for each item from the first storage unit;

a determination unit configured to determine a first terminal which is a terminal of the plurality of terminals with a highest probability of being used by the user based on a current time and the correlation model stored in the third storage unit, in a case where a non-consent item which is an item without consent to use is included in an acquisition result by the acquisition unit, the wireless communication circuit is configured to transmit an inquiry signal which inquires propriety status of consent to use the non-consent item to the first terminal determined by the determination unit, the determination unit is configured to determine a second terminal which is a terminal with a second highest probability of being used by the user after the first terminal among the plurality of terminals as a transmission destination of the inquiry signal based on the current time and the correlation model, when a reply signal including a reply of the user to inquiry of the inquiry signal is not received in the wireless communication circuit within a predetermined period of time after the inquiry signal is transmitted to the first terminal, and the wireless communication circuit is configured to transmit the inquiry signal to the second terminal.

3. An information management method which manages personal information data of a user with confidentiality by an information management device, wherein the information management device stores the personal information data for each item, stores a propriety status of consent to use the personal information data for each item, stores a plurality of pieces of application software that can be activated and the personal information data used by the plurality of pieces of application software, stores a correlation model indicating a correlation between a plurality of terminals owned by the user and a probability that the user uses the plurality of terminals for each time slot, wherein the plurality of terminals are network communicable terminals, acquires, when an activation request to any one piece of application software of the plurality of pieces of application software is inputted, use information data which is the personal information data used by the one piece of application software, acquires the propriety status of consent to use the use information data for each item, determines a first terminal which is a terminal of the plurality of terminals with a highest probability of being used by the user based on a current time and the correlation model, in a case where a non-consent item which is an item without consent to use is included in the use information data, transmits an inquiry signal which inquires propriety status of consent to use the non-consent item to the first terminal, and activates the one piece of application software when a signal of consenting to use the non-consent item is received from the first terminal after the inquiry signal is transmitted to the first terminal, determines a second terminal which is a terminal with a second highest probability of being used by the user after the first terminal among the plurality of terminals as a transmission destination of the inquiry signal based on the current time and the correlation model, when a reply signal including a reply of the user to inquiry of the inquiry signal is not received within a predetermined period of time after the inquiry signal is transmitted to the first terminal, and transmits the inquiry signal to the second terminal.

* * * * *